US007952709B2

(12) United States Patent
Feilders et al.

(10) Patent No.: US 7,952,709 B2
(45) Date of Patent: May 31, 2011

(54) SPECTROCHEMICAL PLASMA TORCH AND METHOD OF MANUFACTURE

(75) Inventors: George Feilders, Beaconfeild (CA); Arthur Ross, Stoney Creek (CA); Neil Ernest Davison, St Eugene (CA)

(73) Assignee: SCP Science, Baie d'Urfé, Quebec (CA)

( * ) Notice: Subject to any disclaimer, the term of this patent is extended or adjusted under 35 U.S.C. 154(b) by 265 days.

(21) Appl. No.: 12/399,406

(22) Filed: Mar. 6, 2009

(65) Prior Publication Data

US 2010/0225909 A1 Sep. 9, 2010

(51) Int. Cl.
*G01N 21/73* (2006.01)

(52) U.S. Cl. .................... 356/316; 250/288; 219/121.48

(58) Field of Classification Search .................. 356/316
See application file for complete search history.

(56) References Cited

U.S. PATENT DOCUMENTS

| | | | |
|---|---|---|---|
| D389,557 | S | 1/1998 | Sweat |
| 5,705,787 | A | 1/1998 | Karanassios |
| 6,709,632 | B2 | 3/2004 | Nakagawa et al. |
| 6,989,529 | B2 | 1/2006 | Wiseman |
| 7,317,186 | B2 | 1/2008 | Montaser et al. |

FOREIGN PATENT DOCUMENTS

JP 8-5555 * 1/1996

OTHER PUBLICATIONS

Matsubara et al., A Ceramic Plasma Torch for Determining Silicon Content in HF Solutions by Inductively Coupled Plasma Atomic Emission Spectrometry, Japanese Journal of Applied Physics, vol. 35, Part 1, No. 8, Aug. 1996, pp. 4541-4544.*

* cited by examiner

*Primary Examiner* — F. L Evans
(74) *Attorney, Agent, or Firm* — Ogilvy Renault LLP

(57) ABSTRACT

The present invention describes a torch for producing a plasma for a spectrochemical analysis comprising: an alumina ceramic injector, a vitreous material inner tube concentric with the injector, and an annular joint between the injector and the inner tube. The joint fixedly attaches the injector and the inner tube together and comprises of an adhesive compatible with vitreous material and alumina ceramic. A method of manufacturing the torch is also described.

14 Claims, 4 Drawing Sheets

SPECTROCHEMICAL PLASMA TORCH AND METHOD OF MANUFACTURE

BACKGROUND OF THE INVENTION

1. Technical Field

The invention relates to a plasma torch for spectrochemical analysis.

2. Description of the Prior Art

A spectrochemical plasma torch is used in various analysis including: Inductively Coupled Plasma (ICP) and Microwave Induced Plasma (MIP). These spectrochemical methods commonly produce a plasma having a temperature of more than 5000 and up to 10,000° K. These spectrochemical methods can be used to detect a wide variety of metallic and some non-metallic elements to very low concentrations. For example, when an ICP is coupled to a mass spectrometer contaminants having a concentration below one part in $10^{12}$ can be detected.

A typical plasma torch for spectrochemical analyses comprises three concentric glass tubes that are fused and therefore fixedly bounded together, where the glass includes borosilicate glass and quartz glass.

These spectrochemical analyses begin with the introduction of an aqueous sample to be tested into a nebulizer that makes the sample an aerosol. The aerosol sample passes into a spray chamber to eliminate any large droplets and finally through an innermost tube or an injector, towards the plasma. Any solids formerly dissolved in the aqueous sample breakdown into ions. These ions separate and are received at a detector (such as a mass spectrometer) that produces a signal proportional to their concentration in the sample.

However, for some sample materials to become an aqueous solution they must be dissolved in an acid medium such as nitric acid or hydrochloric acid. Products such as peroxides may also be used and the dissolving agent depends upon the material that needs to be placed in solution. Hydrofluoric acid is used to help put silicates into solution. When an acidified sample including hydrofluoric acid is introduced from the nebulizer, the sample travels through the spray chamber into the injector to the plasma and has the unwanted side-effect that it is corrosive to a glass injector and dissolves the silicates in the glass. This effect produces additional signals at the detector and reduces the lifespan of the glass plasma injector and thus the torch as a whole.

Therefore, there is a need to produce a plasma torch having resistance to hydrofluoric acid.

SUMMARY OF THE INVENTION

In one aspect of the invention there is a torch for producing a plasma for a spectrochemical analysis comprising: an alumina ceramic injector, a vitreous material inner tube concentric with the injector, and an annular joint between and fixedly attaching the injector and the inner tube together, wherein the annular joint comprises an adhesive compatible with vitreous material and alumina ceramic.

In another aspect of the present invention there is a method of manufacturing a plasma torch for a spectroscopic analysis comprising: providing an alumina ceramic injector comprising an outer wall surface having an outer wall diameter, providing a vitreous material inner tube defining an inlet side hole having an internal diameter, adapting the outer wall diameter and the internal diameter to allow the injector and the inner tube to move freely one within the other, linking the injector and the inner tube to define an annular gap, positioning the inner tube at the inlet side of the injector and producing an annular joint between the injector and the inner tube by applying an adhesive compatible with vitreous material and alumina ceramic into the gap and, allowing the adhesive to cure or set-up within the gap the joint to fixedly attaching the injector and the inner tube.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
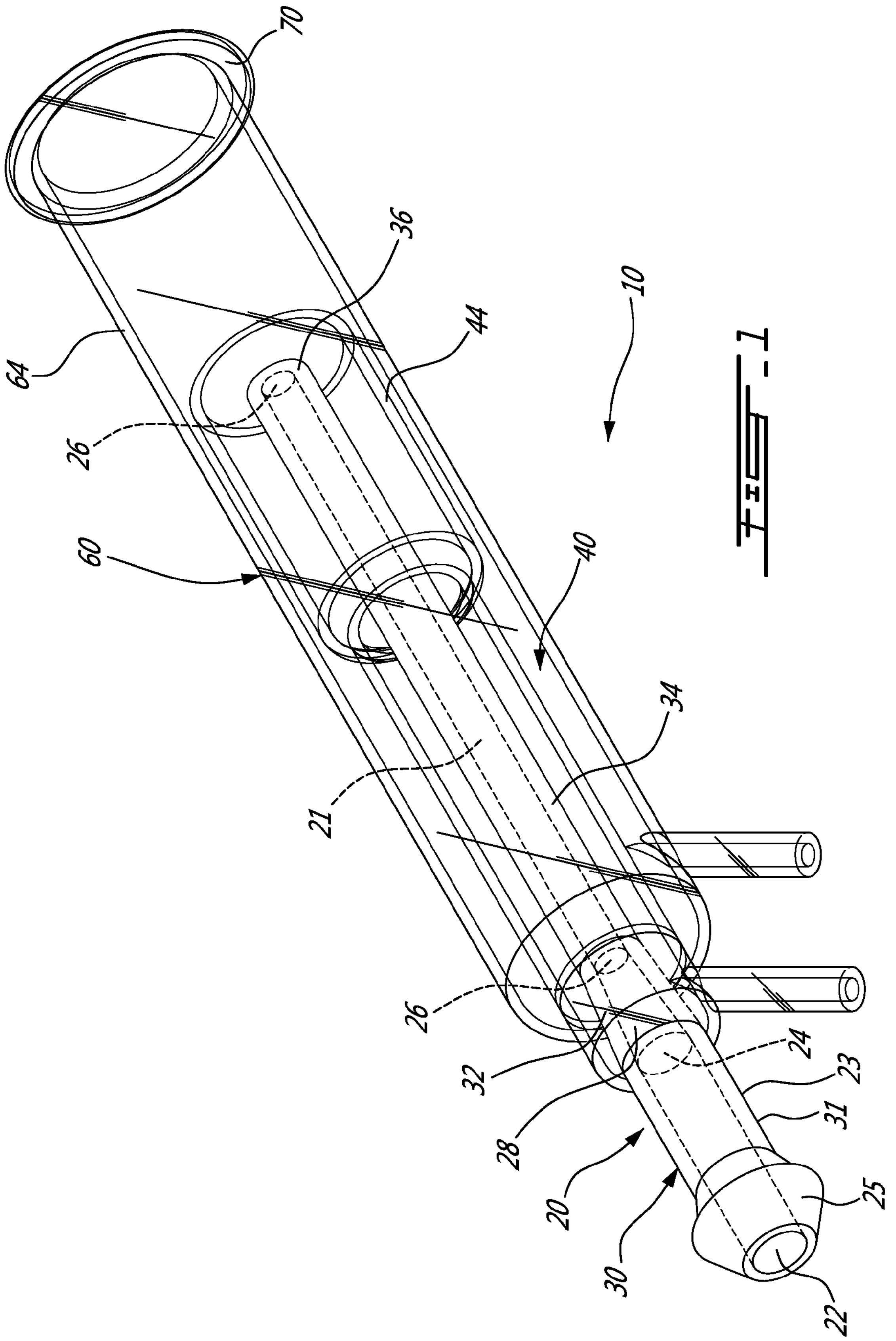
FIG. 1. is a perspective view of the plasma torch according to a preferred embodiment described herein.

FIG. 1 illustrates one embodiment of the plasma torch described of the present invention. A plasma torch 10 is made up generally of three concentric tubes: an injector 20, an inner tube 40 and an outer tube 60. The injector 20 in the present invention is made of an alumina ceramic. The inner tube 40 and the outer tube 60 are preferably transparent, so that the plasma flame produced within the torch will be visible to the operator of the instrument, thus these two outer tubes of the torch 10 are preferably made of a glass. The term "glass" is defined herein as a transparent and non-crystalline material that includes borosilicate glass and quartz glass. The term "quartz glass" is defined herein as melted quartz that is vitreous or non-crystalline, quartz glass is clear to visible and UV light and is also called fused quartz. In a preferred embodiment of the torch 10, the inner tube 40 and the outer tube 60 are both a quartz glass.

In another embodiment of the present invention, the inner tube 40 and the outer tube 60 may also be made of a vitreous material. The term "vitreous material" is understood as a material relating to a glass or a ceramic. Thus the term "vitreous material" encompasses both glass as previously defined and ceramic. The term "ceramic" is understood to be a material that is hard, heat-resistant and corrosion-resistant and herein is understood to comprises compatible ceramics and alumina ceramic. When the inner tube 40 and the outer tube 60 are made of a ceramic they are understood to be opaque. Therefore, one or both of the inner tube 40 and the outer tube 60 may be made from a vitreous material preferably, a ceramic and more preferably an alumina ceramic.

Throughout this description the term "inlet" for each of the three tubes of the torch refers to the side of the torch where either the sample or inert gas is introduced. Similarly, the term "outlet" throughout this description refers to the side to the torch where the plasma is produced and is opposite the sample "inlet" side.

The injector 20 illustrated in FIG. 1 is a slender tube located in the center of the torch 10 and disposed axially within. The injector 20 defines a passage 21 that runs axially the length of the injector 20 from an injector inlet 22 to an injector outlet 36. Alumina ceramic is not transparent and therefore the passage 21 is illustrated in the accompanying figures in hidden lines.

The passage 21 defined within the injector 20 includes a vena contracta in the form of a truncated cone 28 or frustum, where the diameter of the passage 21 is reduced from an inlet diameter 24 to an outlet diameter 26 that remains substantially constant from the frustum to the outlet 36 of the injector 20.

Figure 2:
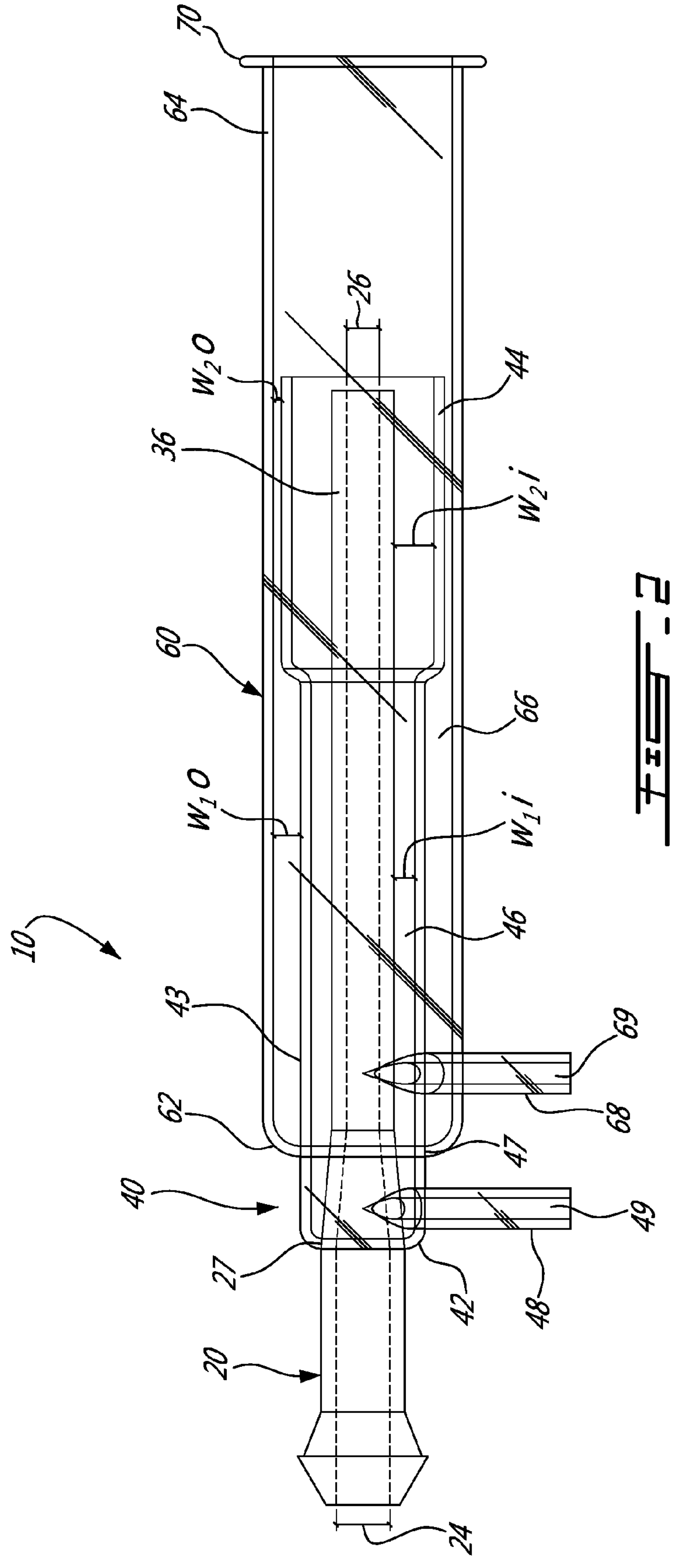
FIG. 2. is a side view of the plasma torch according to FIG. 1.
Figure 3:
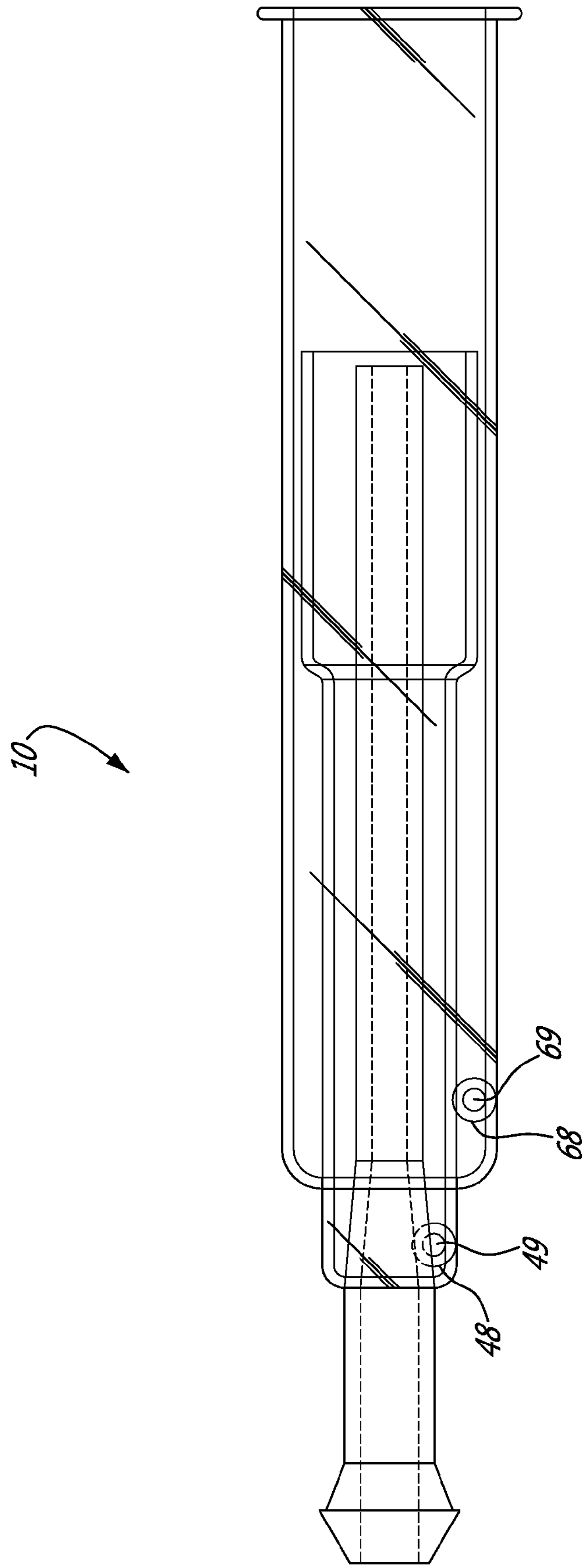
FIG. 3. is a top view of the plasma torch according to FIG. 1.

As illustrated in FIGS. 1 to 3, the injector 20 has an outer surface 30 with three surfaces. The surface 31 comprises a larger diameter inlet surface 31 and a smaller diameter outlet surface 34 that are linked by a outer truncated cone 32 or frustum surface. This truncated cone surface 32, may be substantially co-linear with the truncated conical passage 28 defined within the injector 20. Co-linear is understood to be mean that the outer surface 32 and the passage 28 define surfaces that are parallel. The outer surfaces 31 and 34 remain substantially the same diameter along their entire lengths.

At the injector inlet 22, there may be a sample connector 25 shaped in such a way as to connect to a spray nebulising chamber (not illustrated) from where samples to be analyzed are made into aerosols and introduced into the injector 20.

Figure 4:
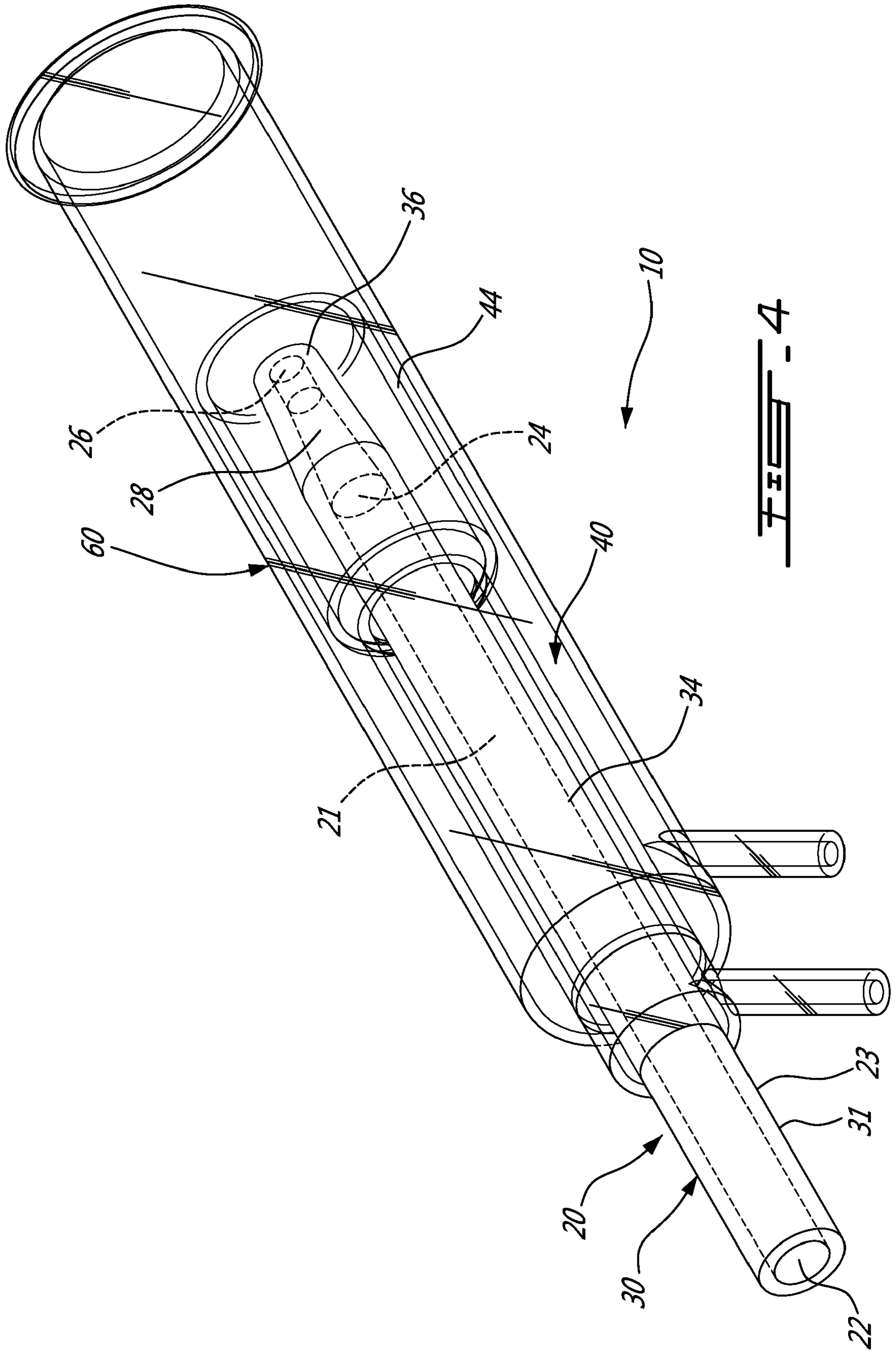
FIG. 4. is a perspective view of the plasma torch according to another preferred embodiment described herein.

Although the injector of the present invention may have an outer surface 30 comprising multiple surfaces, in another embodiment illustrated in FIG. 4 the injector 20 has an outer surface 30 having substantially one diameter along its entire length, that is, little to no variation in the outer surface diameter. The injector 20 illustrated in FIG. 4 does display a reduction of the outer surface diameter towards a tip at the injector outlet 36. This narrowing at the tip of the otherwise uniform injector 20 is a preferred embodiment included to maintain the appropriate flow of gas within the torch 10.

Alumina ceramic is known to have good corrosion resistance to hydrofluoric acid. However the melting point of alumina ceramic and quartz glass are substantially different and as such the two materials cannot be fused together by conventional glass working methods. The alumina ceramic is understood to be less fragile than glass materials (borosilicate and quartz glasses) and is also compatible with a greater number of sample aerosols typically used in spectrochemical analyses. The overall lifespan of the injector including at least an alumina injector will be longer than a conventional torch and allow analyses of a wider variety of samples including those that have hydrofluoric acid.

The inner tube 40, has two sections 42 and 44 with different diameters both of which are larger than the outer diameter of the injector 20. The injector 20 and the inner tube 40 are attached at the inner tube inlet section 42 side where the inner tube bends radially inward towards the injector 20. Before being attached to the injector, the inner tube defines an attachment hole slightly larger than the outer surface diameter of the injector. The injector and the inner tube are positioned and then fixedly attached at an annular joint 27 adjacent an inlet side 23 of the injector. The annular joint 27 comprises an adhesive compatible to both vitreous material of the inner tube and the alumina ceramic of the injector and that attaches the injector to the inner tube fixedly. Fixedly attached is defined herein as a joint that cannot be separated, without breakage. In a preferred embodiment the annular joint 27 is made adjacent a juncture between the larger diameter inlet surface 31 and the truncated outer surface 32. The outside on the inner tube 40 may be sand blasted. The purpose of which is to camouflage the adhesive joint. The inlet hole defined at the inlet 42 side of the inner tube 40 is sized be substantially that of the larger diameter inlet surface 31 and thus, to meet at or near the juncture between the larger diameter inlet surface 31 and the truncated outer surface 32.

The adhesive of the annular joint 27 in a preferred embodiment is an epoxy (one or two part system) or acrylic adhesive that is compatible with vitreous materials and alumina ceramic. In the case where the vitreous material is a glass as previously defined as illustrated in FIGS. 1 to 3, a preferred adhesive is a UV curable acrylic adhesive. The acrylic adhesive that is most preferred is an UV curable modified acrylic adhesive, Loctite® 352™.

When the inner tube 40 is an opaque vitreous material, such as an alumina ceramic, the adhesive is either an epoxy (one or two part system) or an acrylic. In a preferred embodiment the adhesive the for an opaque vitreous material is an acrylic adhesive that is cured thermally. The most preferred adhesive is modified acrylic adhesive, Loctite® 352™ that is thermally cured.

Surprisingly, the adhesive is not degraded either thermally by the radiative heat or by the intense light of the plasma and does maintain the tube in concentric alignment. Without being formally bound by the following interpretation, it is believed that the joint 27 is protected by the argon gas that flows around the joint 27 and the vitreous material on top of the joint act to protect the adhesive within the joint 27 from the high temperatures and light emitted by the torch 10. The expression "compatible with vitreous material and alumina ceramic" is understood to mean that the adhesive will bind fixedly to alumina ceramic and vitreous material, bind to produce and maintain the concentricity of the injector/inner tube and when applied to the outer tube and withstand temperatures consistent with normal operation of the plasma torch. Thus the adhesive will be compatible for alumina ceramic glass bonding as well as alumina ceramic/alumina ceramic bonding.

The inner tube 40 is concentric with the injector 20 and substantially covers the outlet 36 of the injector. In a preferred embodiment the injector outlet 36 ends within periphery of the inner tube outlet 44.

The injector 20 and the inner tube 40 define an inner annular space 46 between each other. The annular space 46 having a first width, $w_1i$ at inner tube inlet 42 and a second width, $w_2i$ at inner tube outlet 44 produced by the change diameter of the inner tube 40.

The inner tube 40 also includes a side arm 48 attached at the inner tube inlet 42 side. The side arm 48 defines a bore 49 that has a dimension substantially that of the first width, $w_1i$ of the annular space 46, as best seen in FIG. 3.

The outer tube 60 has typically a single diameter that is larger than that of the outlet section of the inner tube. The outer tube 60 is attached to the inner tube 40 on inlet side 62 of the outer tube and at an outer annular glass joint 47 on the outer surface 43 of the inner tube. The outer tube 60 is concentric with inner tube 40 (and the injector 20) and covers the outlet 44 of the inner tube.

The inner tube 40 and the outer tube 60 define an outer annular space 66 between each other. The annular space 66, has one larger width, $w_1o$ at the inlet 62 of the outer tube and a second narrow width, $w_2o$ at the outlet 44 produced by the change diameter of the inner tube 40. At the end of the inner tube 40 the outlet of the outer tube remains unobstructed. During the operation of the spectrochemical analysis, it is understood that radio frequency (RF) coils used to produce the plasma within the torch 10, are located around the outer surface of the outer tube 60 adjacent to this unobstructed zone within the torch.

The outer tube 60 also includes a side arm 68 at an inlet 62 side. The side arm 68 defines a bore 69 that has a dimension substantially that of the first width, $w_1o$ of the annular space 66.

Therefore, during operation of a spectrochemical method such as inductively coupled plasma, an inert gas such as argon is injected respectively via side arms 48 and 68 into the annular space 46 and 66. The radio frequency (RF) coils positioned at the outer tube outlet 64 are activated to produce a plasma from the argon coolant gas. Then the sample that is to be studied is passed through the injector and into the plasma where the sample is ionized and then analyzed by a detection method such as mass spectroscopy.

As previously described, the torch 10 of the present invention comprises an alumina ($Al_2O_3$) ceramic injector 20 tube. An alumina ceramic is understood in a preferred embodiment, to have an alumina ($Al_2O_3$) composition of more than 80 w/w % of the total composition. More preferably, the alumina composition of an alumina ceramic is greater than 90 w/w % and more preferably greater than 95 w/w % and most preferably greater than 99% w/w $Al_2O_3$ of the total composition of the alumina ceramic. High purity commercial grades of alumina ceramic have a composition of greater than 96% and 99.6% w/w.

The plasma torch of the present invention is produced by providing an alumina ceramic injector having at least a single outer surface diameter. The outer surface diameter of the injector is such that it allows entry into a very close tolerance a hole on the inlet side of the inner tube. The tolerance between the hole on the inner tube and the outer diameter of the injector from 0.2 to 0.02 mm, preferably 0.1 to 0.025 mm. In a preferred embodiment the tolerance that balances the need for concentricity, the amount of adhesive, the cure time and the ease of linking or insertion of injector and inner tube is 0.05±0.01 mm of the outside diameter.

Therefore, before inserting the injector into the inlet hole of the inner tube, the contact surfaces of the outer diameter of the injector and the inner diameter must be adapted to the required tolerance and to allow the injector and the inner tube to move freely one within the other. Typically at this point the position of the annular joint 27 on the injector 20 will be marked. A compatible adhesive may be applied at this point to the annular joint that has been marked.

The injector and the inner tube are linked by either inserting the injector into the inner tube or sliding the inner tube over the injector. Thus a narrow annular gap is defined between the injector and the inner tube when they are linked by insertion one into the other. The inner tube is then positioned at the location marked on the inlet side 23 of the injector. If not already applied to the injector, the adhesive compatible with vitreous material and alumina ceramic is applied into the annular gap defined between the injector and the inner tube.

The joint 27 is produced by allowing the adhesive to cure or set-up thus fixedly attaching the injector and the inner tube. The torches may be modified with regard to inlet, outlet, and side arm positioning and the shape and orientation of the injector, inner tube and outer tube may be adapted to meet the requirements of the various manufacturers of spectrochemical instruments.

In a preferred embodiment, the injector is provided with a truncated conical 32 section and two constant diameter sections as illustrated in FIGS. 1 to 3. The annular joint 27 is made adjacent a juncture between the larger diameter inlet surface 31 and the truncated outer surface 32. The inlet hole defined at the inlet 42 side of the inner tube is sized to be substantially that of the larger diameter inlet surface 31 and thus, to meet at or near this juncture between the larger diameter inlet surface 31 and the truncated outer surface 32. This method also helps to align the injector concentrically and position the inner tube at the appropriate distance along the length of the injector and allows the injector and the inner tube to move more easily before the joint is made because the diameter outlet surface is smaller than the inlet hole on the inlet side of the inner tube. This method would also allow the application of the adhesive before the injector and the inner tube are linked.

EXAMPLE

A plasma torch as illustrated in FIG. 4 comprising an alumina ceramic injector of commercial grade 99.6% alumina ceramic and a quartz glass inner tube and outer tube was produced. The inner annular joint 27 was produced using the method described herein and an UV curable modified acrylic adhesive, Loctite® 352™. The plasma torch produced was placed in an Inductively Coupled Plasma Optical Emission Spectrometer (ICP-OES) having a plasma temperature in the range of 10,000° K. The ICP-OES has operated without interruption for a period of 4 months using a variety of aerosol samples including those dispersed with hydrofluoric acid.

The embodiment(s) of the invention described above is (are) intended to be exemplary only. The scope of the invention is therefore intended to be limited solely by the scope of the appended claims.

We claim:

1. A torch for producing a plasma for a spectrochemical analysis comprising:
- an alumina ceramic injector,
- a vitreous material inner tube concentric with the injector, and
- an annular joint between and fixedly attaching the injector and the inner tube together, wherein the annular joint comprises an adhesive compatible with vitreous material and alumina ceramic.

2. The torch of claim 1, wherein the vitreous material of the inner tube is a glass.

3. The torch of claim 1, wherein the vitreous material of the inner tube is an alumina ceramic.

4. The torch of claim 2, further comprising a glass outer tube concentric with the inner tube, and
- an outer annular glass joint between and holding the inner tube and the outer tube together.

5. The torch of claim 3, further comprising an alumina ceramic outer tube concentric with the inner tube, and
- an outer annular joint between and holding the inner tube and the outer tube together, wherein the outer annular joint comprises an adhesive compatible for alumina ceramic/alumina ceramic bonding.

6. The torch of claim 4 wherein the glass of the inner tube and the outer tube is a quartz glass.

7. The torch of claim 1, wherein the adhesive comprises an UV curable acrylic adhesive.

8. The torch of claim 1 wherein the alumina ceramic injector has a composition of greater than 90% w/w $Al_2O_3$.

9. The torch of claim 1 wherein the alumina ceramic injector has a composition of greater than 95% m/m $Al_2O_3$.

10. The torch of claim 1 wherein the alumina ceramic injector has a composition of greater than 99% m/m $Al_2O_3$.

11. The torch of claim 1, wherein the injector further comprises an outer surface comprising
- a larger diameter inlet surface,
- a smaller diameter outlet surface and
- an truncated outer surface linking and reducing the diameter of the outer surface of the injector from the inlet surface to the outlet surface,
- wherein the annular joint is made adjacent a juncture between the larger diameter inlet surface and the truncated outer surface.

12. The torch of claim 1, wherein the injector further comprises an outer surface comprising an outer surface with substantially one diameter along the injector length.

13. The torch of claim 12, wherein the injector has an outer wall diameter reduction at a tip of the injector.

14. A method of manufacturing a plasma torch for a spectroscopic analysis comprising:

providing an alumina ceramic injector comprising an outer wall surface having an outer wall diameter, providing a vitreous material inner tube defining an inlet side hole having an internal diameter, adapting the outer wall diameter and the internal diameter to allow the injector and the inner tube to move freely one within the other, linking the injector and the inner tube to define an annular gap, positioning the inner tube at the inlet side of the injector and producing an annular joint between the injector and the inner tube by applying an adhesive compatible with vitreous material and alumina ceramic into the gap and, allowing the adhesive to cure or set-up within the gap joint to fixedly attach the injector and the inner tube.

* * * * *